(12) United States Patent
Frankel

(10) Patent No.: US 8,510,207 B2
(45) Date of Patent: Aug. 13, 2013

(54) METHOD AND APPARATUS FOR LISTING AND TRADING A FUTURES CONTRACT THAT PHYSICALLY SETTLES INTO A SWAP

(75) Inventor: Oliver L. Frankel, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 142 days.

(21) Appl. No.: 13/045,700

(22) Filed: Mar. 11, 2011

(65) Prior Publication Data

US 2011/0161224 A1 Jun. 30, 2011

Related U.S. Application Data

(63) Continuation of application No. 11/761,490, filed on Jun. 12, 2007, now Pat. No. 7,930,238.

(60) Provisional application No. 60/886,764, filed on Jan. 26, 2007.

(51) Int. Cl.
*G06Q 40/00* (2012.01)

(52) U.S. Cl.
USPC .......................................... 705/37; 705/36 R

(58) Field of Classification Search
USPC ...................................... 705/35–37
See application file for complete search history.

(56) References Cited

U.S. PATENT DOCUMENTS

| | | | | |
|---|---|---|---|---|
| 7,792,730 | B2 * | 9/2010 | Kastel et al. | 705/36 R |
| 8,001,022 | B2 * | 8/2011 | Kastel et al. | 705/35 |
| 2005/0044034 | A1 * | 2/2005 | Perry et al. | 705/37 |
| 2005/0080734 | A1 * | 4/2005 | Lynch et al. | 705/40 |
| 2005/0086152 | A1 * | 4/2005 | Sweeting | 705/37 |
| 2006/0253360 | A1 * | 11/2006 | Gould | 705/35 |
| 2008/0010221 | A1 * | 1/2008 | Co et al. | 705/36 R |
| 2008/0033863 | A1 * | 2/2008 | Simons et al. | 705/37 |

OTHER PUBLICATIONS

Bystrom, H., Back to the Future: Futures Margins in a Future Credit Default Swap Index Futures Market, The Journal of Futures Markets, vol. 27, No. 1, pp. 85-104 (2007).*
Batchelor, C., Itraxx Boosts Credit Derivatives: The Creation of a Single Family of Credit Default Swaps Indices is Likely to Spur Rapid Grown in the Market Thi; Jan. 5, 2005, Financial Times. London (UK), p. 43.*
Zwick, S. New Products for a New World, Jan. 2007, Futures. Chicago. vol. 26, Iss. 1 p. 62, 4pgs.*
Eurex Circular 266/06 to All Eurex Members and Vendors, X-Pand into the Future, Frankfurt, Dec. 21, 2006.*

* cited by examiner

*Primary Examiner* — Hani M Kazimi
(74) *Attorney, Agent, or Firm* — Perkins Coie LLP

(57) ABSTRACT

According to some embodiments, a futures contract is listed on a futures trading exchange. The futures contract physically settles upon expiration into a reference swap. The reference swap is cleared by a clearing house so that the physical settlement requires that the holder of a position in the futures contract upon expiration takes a specified side of the reference swap against the clearing house. The reference swap may for example be a credit default index swap, a single-name credit default swap, an interest rate swap or a yield curve swap.

19 Claims, 11 Drawing Sheets

FUTURES CONTRACT TERMS

| | | |
|---|---|---|
| CURRENCY | US DOLLARS | 252 |
| REFERENCE INTEREST RATE SWAP | FLOATING/FLOATING: 2 YEAR CONSTANT MATURITY LIBOR/10 YR CONSTANT MATURITY LIBOR (TENOR: 5YR) | 254 |
| FUTURES CONTRACT EXPIRATION | 9/20/07 | 256 |
| DATE LISTED | 3/20/07 | 258 |
| NOTIONAL VALUE | $1,000,000 | 260 |
| QUOTE CONVENTION | PERCENT OF NOTIONAL VALUE | 262 |
| TICK SIZE | 0.01 | 264 |
| SETTLEMENT | "PHYSICAL"--INTO THE REFERENCE INTEREST RATE SWAP LONG FUTURE>>>PAYS 10 YR LIBOR SHORT FUTURE>>>PAYS 2 YR LIBOR (SWAP CLEARED BY CLEARING HOUSE) | 266 |
| TRADING HOURS | CONFORM TO CME GLOBEX | 268 |

FUTURES CONTRACT TERMS

| CURRENCY | US DOLLARS | |
|---|---|---|
| REFERENCE INTEREST RATE SWAP | FLOATING/FLOATING: 2 YEAR CONSTANT MATURITY LIBOR/10 YR CONSTANT MATURITY LIBOR (TENOR: 5YR) | 254 |
| FUTURES CONTRACT EXPIRATION | 9/20/07 | 256 |
| DATE LISTED | 3/20/07 | 258 |
| NOTIONAL VALUE | $1,000,000 | 260 |
| QUOTE CONVENTION | PERCENT OF NOTIONAL VALUE | 262 |
| TICK SIZE | 0.01 | 264 |
| SETTLEMENT | "PHYSICAL"--INTO THE REFERENCE INTEREST RATE SWAP<br>LONG FUTURE>>>PAYS 10 YR LIBOR<br>SHORT FUTURE>>>PAYS 2 YR LIBOR<br>(SWAP CLEARED BY CLEARING HOUSE) | 266 |
| TRADING HOURS | CONFORM TO CME GLOBEX | 268 |

Note: 252 marks the CURRENCY row.

*FIG. 3*

FUTURES CONTRACT TERMS

| CURRENCY | US DOLLARS | 302 |
|---|---|---|
| REFERENCE CREDIT SWAP | CDX.NA.IG 7Y | 304 |
| FUTURES CONTRACT EXPIRATION | 9/20/07 | 306 |
| DATE LISTED | 3/16/07 | 308 |
| NOTIONAL VALUE | $1,000,000 | 310 |
| QUOTE CONVENTION | PERCENT OF NOTIONAL VALUE | 312 |
| TICK SIZE | 0.01 | 314 |
| SETTLEMENT | "PHYSICAL"--INTO THE REFERENCE CREDIT SWAP<br>LONG FUTURE>>>RECEIVES FIXED<br>SHORT FUTURE>>>PAYS FIXED<br>(SWAP CLEARED BY CLEARING HOUSE) | 316 |
| TRADING HOURS | CONFORM TO CME GLOBEX | 318 |

FIG. 3A

METHOD AND APPARATUS FOR LISTING AND TRADING A FUTURES CONTRACT THAT PHYSICALLY SETTLES INTO A SWAP

CROSS-REFERENCE TO RELATED APPLICATION

This application is a Continuation of and claims priority under 35 U.S.C. §120 to prior U.S. non-provisional patent application Ser. No. 11/761,490, filed Jun. 12, 2007, entitled, "METHOD AND APPARATUS FOR LISTING AND TRADING A FUTURES CONTRACT THAT PHYSICALLY SETTLES INTO A SWAP," which in turn is a Non-Provisional of and claims priority under 35 U.S.C. §119 to prior provisional patent application No. 60/886,764, filed Jan. 26, 2007. The entirety of the aforementioned applications are herein expressly incorporated by reference.

FIELD

The present invention relates to financial derivatives and computer systems and computer-implemented methods for facilitating trading of financial derivatives. In some embodiments, the present invention relates to methods and apparatus for listing and trading improved swap futures contracts.

BACKGROUND

There are a wide variety of financial derivatives currently available in the market. In general, a financial derivative is a contract or financial product whose economic value can be derived from one or more other financial products.

One type of financial derivative is a financial futures contract such as a stock market index futures contract. Typically stock market futures contracts require cash settlement on the expiration date in an amount based on the reference stock market index. "Dow futures" are one example of a stock market futures contract, and use the Dow Jones Industrials index as the reference index.

Another type of financial derivative is referred to as a "swap". One type of swap is referred to as an "interest rate swap". In one variety of interest rate swap, one counterparty agrees to make fixed payments of interest to the other counterparty over a period of time (for example, five years) on a notional amount of principal. The second counterparty agrees to make payments to the first counterparty that fluctuate over the period of time in accordance with fluctuations in a "floating" interest rate (such as the LIBOR (London Interbank Offered Rate) 3 month rate). This type of interest rate swap is referred to as a fixed/floating interest rate swap. The period of time during which the swap is effective may be referred to as its "tenor". The party that receives the fixed side of the interest rate swap may do so in order to hedge against future interest rate fluctuations. The party that receives the floating side of the interest rate swap may do so in order to speculate on future changes in interest rates. Interest rate swaps and other swaps may also be employed as part of financial strategies that are much more complex than simple hedging or speculation.

Another type of swap is referred to as a "credit default swap". In a credit default swap, one counterparty agrees to make fixed payments (sometimes referred to as the "coupon") to the other counterparty over the term of the swap on a notional amount of principal. The second counterparty in the credit default swap assumes a contingent obligation to make one or more payments to the first counterparty in the event that a "credit event" such as bankruptcy or financial default occurs with respect to one or more borrowers or issuers of debt obligations. The counterparty who receives the fixed payments is said to receive the fixed side of the credit default swap. The counterparty who stands to benefit in the event that the contingent obligation becomes payable is said to receive the floating side of the credit default swap. In some credit default swaps, the payment of the floating side is conditioned on the receiver of the floating side tendering, to the payer of the floating side, debt obligations issued by the referenced issuer (the "name") in a face amount equal to the notional amount of the swap. Other types of credit default swaps do not include this condition for receipt of the floating side contingent obligation.

The party who receives the floating side of a credit default swap may do so for the purpose of hedging against credit risk of the reference name or names. The party who receives the fixed side of a credit default swap may do so for the purpose of speculating on changes in credit standing of the reference name or names. As in the case of interest rate swaps, credit default swaps may be employed in connection with much more complex financial strategies than simple hedging or speculation.

A credit default swap in which the floating side is contingent on occurrence of a credit event with respect to only one reference name may be referred to as a "single-name credit default swap". Another type of credit default swap is defined in terms of a basket of names that are assembled into an index. A credit default swap of this type is referred to as a "credit default index swap". One well known group of credit default index swaps is defined with reference to one or another of the "iTraxx" indices. A presentation entitled "iTraxx Europe CDS Indices—Series 7 (March 2007)", downloaded from the website www.indexco.com, provides an example description (pages 13-15) of how a typical iTraxx credit default index swap operates. Another well known group of credit default index swaps is defined with reference to one or another of the Dow Jones CDX indices. The Dow Jones CDX credit default index swaps operate in a similar fashion to iTraxx credit default index swaps. (In a change of nomenclature, indices formerly known as Dow Jones CDX indices are to be known in the future simply as CDX indices, without the "Dow Jones" branding.)

In another variation, credit default index swaps may be defined in terms of "tranches". Each tranche is defined by two percentages. The first percentage represents the "subordination level" and indicates what percentage of loss (if any) is borne by floating side payors of junior tranches. The second percentage represents the upper limit of the credit loss, as a percentage of the size of the underlying reference portfolio.

To provide a specific example of tranches in a credit default index swap, consider the "CDX NA IG" (CDX North America, Investment Grade) Series 8 index: Five tranches are defined for this credit default index swap: The most junior tranche (sometimes referred to as the "equity" tranche) is defined by percentages 0-3% and thus carries the risk of loss with respect to the first 3 percent of the reference portfolio. The next tranche is 3-7% and is referred to as the "junior mezzanine" tranche. The succeeding tranche is 7-10% ("senior mezzanine"), and the remaining two are 10-15% ("senior") and 15-30% ("super senior"). To further specify the example, the floating payor of the senior tranche will only realize a principal loss if there are a sufficient number of defaults for the losses to exceed the subordination of 10% over the life of the tranche, and will lose all the principal when the losses reach the upper limit for the tranche (i.e., 15% of the portfolio).

As another example of tranches, for the iTraxx-Europe Series 7 credit default index swap five tranches are defined as follows: 0-3%, 3-6%, 6-9%, 9-12% and 12-22%.

The Eurex financial exchange has listed a futures contract based on the iTraxx Europe Series 7 index. According to the Eurex iTraxx futures contract, on expiration, settlement is to be made in cash according to a value fixed with respect to a particular iTraxx index as of the expiration date by the International Index Co. (IIC). IIC is the organization that generates the baskets and coupon rates for the iTraxx family of credit default index swaps.

There are certain problems that will be experienced with respect to credit default index swap futures contracts of the type listed by Eurex. For example, due to cash settlement, market makers in that type of contract will experience a large change in exposure on the expiration date, reducing the amount of liquidity they can bring to this futures contract. Moreover, there may be uncertainty as to the regulatory status of such a contract in the United States.

SUMMARY

In light of the foregoing, embodiments of the present invention concern a method, a system, an apparatus, and a medium storing processor-executable process steps to list a futures contract. The futures contract includes terms that require entry into a specified swap on a specified date. In one embodiment, the futures contract provides that (i) a long position in the futures contract entitles the holder of the long position to receive the fixed side of the specified swap on the specified date, and (ii) a short position in the futures contract entitles the holder of the short position to receive a floating side of the specified swap on the specified date. In an alternative embodiment, the futures contract provides that (i) a short position in the futures contract entitles the holder of the short position to receive the fixed side of the specified swap on the specified date, and (ii) a long position in the futures contract entitles the holder of the long position to receive a floating side of the specified swap on the specified date. An exchange that lists the futures contract may receive one or more electronic signals that represent, respectively, an order to buy or an order to sell the futures contract.

In another aspect, embodiments of the present invention concern a method, a system, an apparatus, and a medium storing processor-executable process steps to provide a computer implemented method of trading. The method may include trading a futures contract of the type described in the preceding paragraph. The trading may include electronically transmitting an order to buy or an order to sell the futures contract. The computer implemented method may also include generating at least one parameter (such as size, limit price and/or side) for the order.

In yet another aspect, embodiments of the present invention concern a method, a system, an apparatus, and a medium storing processor-executable process steps to make a market in a futures contract of the type described in the first paragraph of this "Summary" section, and to receive one or more electronic signals, each respectively representing an order to buy or an order to sell the futures contract. The step of making the market may include submitting or accepting limit orders for the futures contract.

In still another aspect, embodiments of the present invention concern a method, a system, an apparatus, and a medium storing processor-executable process steps to operate a computer system to generate data that represents an order to buy or an order to sell a futures contract of the type described in the first paragraph of this "Summary" section, and to transmit the data from the computer system.

In another aspect, embodiments of the present invention concern a method that includes holding a position in a futures contract. The futures contract includes terms that require entry into a specified swap on a specified date. The method further includes settling the futures contract on the specified date by entering into the specified swap. A record of the position in the futures contract and/or a record of the position in the specified swap that results from settlement of the futures contract may be stored in a computer operated by a trader or broker.

In any one or more of the above aspects, the specified swap may be against a specified counterparty, such as a clearing house. The specified swap may be a credit default index swap or a single-name credit default swap. Alternatively, the specified swap may be a fixed/floating interest rate swap. If the specified swap is a credit default index swap, it may be defined according to any one of the following well known indices: (a) a Dow Jones CDX index, (b) a CDX index, (c) an iTraxx index, (d) an ABX index, (e) a CMBX index, (f) an ECMBX index, and (g) an LCDX index. The specified swap may be defined in terms of a tranche of a credit default index swap.

In alternative embodiments, the specified swap may be of a type that is different from the types of swaps enumerated in the previous paragraph.

In some aspects, it may be particularly advantageous that the futures contract physically settles into a swap that is cleared via a clearing house. By providing such a futures contract, and providing for cleared swaps into which the futures contract physically settles on expiration, dealers may be able to make better markets in such futures contracts since they will not face large changes in exposure upon expiration of the futures contract. Further, since there may be an underlying over-the-counter market in the cleared swaps, the value of the futures contract on expiration may be validly determined by the underlying swaps market, thereby undergirding the integrity of the futures contract.

Moreover, the physical settlement of the futures contract into a cleared swap may promote a favorable regulatory treatment for the futures contract.

Still further, providing a futures contact as a derivative of an underlying swap may bring futures traders as additional sources of liquidity to the market for credit derivatives or interest rate derivatives, thereby enhancing the over-all liquidity of those markets.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 3 is a diagram that illustrates terms of a futures contract that may be traded in the system of FIG. 1.

FIG. 3A is a diagram that illustrates terms of another example futures contract.

DETAILED DESCRIPTION

In general, and for the purposes of introducing concepts of embodiments of the present invention, a futures contract is traded and provides for physical settlement, upon expiration, into a swap. To accomplish the physical settlement, the holder of a position in the futures contract may be required to take a specified side of the underlying swap with a clearing house as the counterparty. For example, the holder of a long position in the futures contract may be required on expiration to receive the fixed side of the swap against the clearing house, while the holder of a short position in the futures contract may be required on expiration to receive the floating side of the swap against the clearing house.

Figure 1:
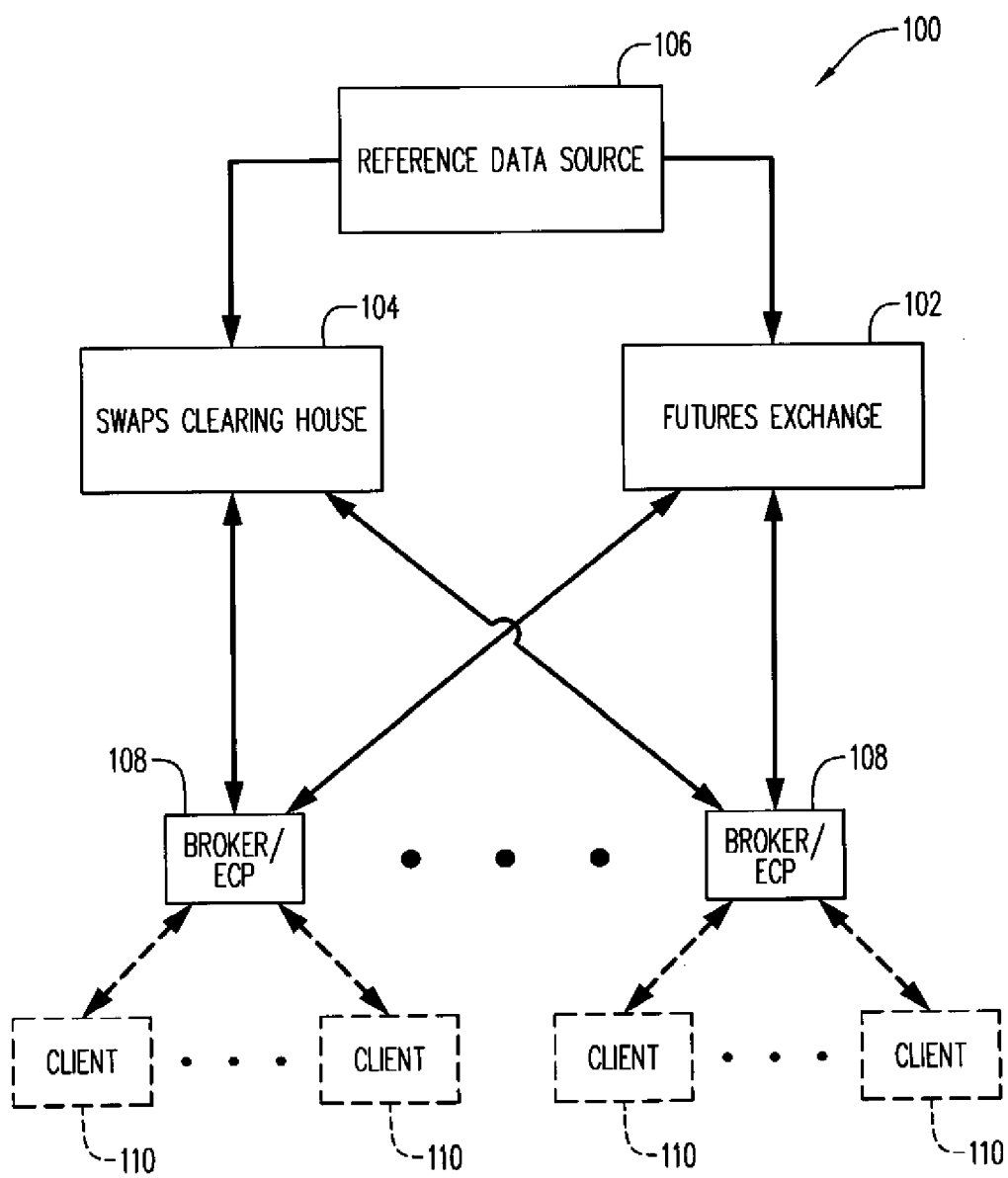
FIG. 1 is a block diagram that illustrates a system provided in accordance with some embodiments of the invention to facilitate trading in futures contracts.

Features of some embodiments of the present invention will now be described by first referring to FIG. 1. FIG. 1 is a block diagram that illustrates a system 100 provided in accordance with some embodiments of the invention to facilitate trading in futures contracts. As illustrated in FIG. 1, a central component of the system 100 is a futures trading exchange 102 (each of the blocks shown in FIG. 1 should be understood to represent either or both of (a) an institution or entity, and (b) one or more computers operated by or on behalf of the institution or entity). The futures trading exchange 102 may operate generally in accordance with conventional practices, except that the exchange 102, in accordance with embodiments disclosed herein, may list and facilitate trading in one or more novel futures contracts as described herein. The futures trading exchange 102 may trade other futures contracts in addition to the novel futures contracts described herein and may also list options or other financial products, and/or may also facilitate trading in non-financial assets such as commodities. The futures trading exchange 102 may be an existing exchange already in operation for purposes other than listing and trading of the novel futures contracts described herein, or may be specially created and organized at least in part for the purpose of listing and facilitating trading in the novel futures contracts described herein. As will be appreciated by those who are skilled in the art, the futures trading exchange 102 may perform functions normally performed by a trading exchange, such as listing contracts for trading, receiving and matching orders to buy and sell the listed contracts, providing current quotations and reports concerning open orders and trading activity on the exchange 102.

The futures trading exchange 102 may also admit brokers into membership in the exchange and may regulate activities of member brokers.

As is commonly the case with trading exchanges, much or all of the trading activity, and other functions as well, may be handled automatically by one or more computer systems operated by or on behalf of the exchange 102. Such computer system(s) are not separately indicated in FIG. 1, but one such computer system is described below in conjunction with FIG. 2.

Another significant component of the trading system 100 is a swaps clearing house 104. More details concerning the swaps clearing house 104 will be provided below, but suffice it to say for the moment that the swaps clearing house acts as a counterparty with respect to traders or investors who wish (or are required) to take one side or the other of swaps that underlie the novel futures contracts described herein.

There may also be a reference data source 106 that is part of the trading system 100. The reference data source 106 may provide data to either or both of the futures trading exchange 102 and the swaps clearing house 104. The data provided may be, for example, the composition and/or weighting of a basket of names for a credit default index swap that may be cleared by the swaps clearing house 104 and that may underlie one or more futures contracts listed by the futures trading exchange 102. Data from the reference data source 106 may also govern the setting of a coupon rate for such a credit default index swap. As another alternative, data from the reference data source 106 may govern the setting of a coupon rate for a single-name credit default swap that may be cleared by the swaps clearing house 104 and that may underlie one or more futures contracts listed by the futures trading exchange 102. In addition or alternatively, the reference data source 106 may provide "spread" data with respect to one or more interest rate swaps that may be cleared by the swaps clearing house 104 and that may underlie one or more futures contracts listed by the futures trading exchange 102. For the purposes of interest rate swaps, credit default swaps, credit default index swaps or other swaps cleared by the swaps clearing house 104 and/or that underlie one or more futures contracts listed by the futures trading exchange 102, the data provided by the reference data source 106 may also be utilized for marking positions in the swaps/futures contracts to market and margining the accounts of holders of positions in the swaps/futures contracts.

Continuing to refer to FIG. 1, a number of brokers/trading firms 108 may be participants in the trading system 100. The brokers/trading firms 108 may place orders with the futures trading exchange 102 for clients 110 who maintain accounts with the brokers/trading firms. In addition or alternatively the brokers/trading firms 108 may take positions themselves/place orders for their own account with the futures trading exchange 102. Moreover, in at least some cases, the brokers/trading firms may enter into swaps against the swaps clearing house 104. The brokers/trading firms 108 may each be required to be an Eligible Contract Participant (ECP) as defined in the Commodity Futures Modernization Act of 2000. At least some of the clients 110 may also be ECPs.

Figure 2:
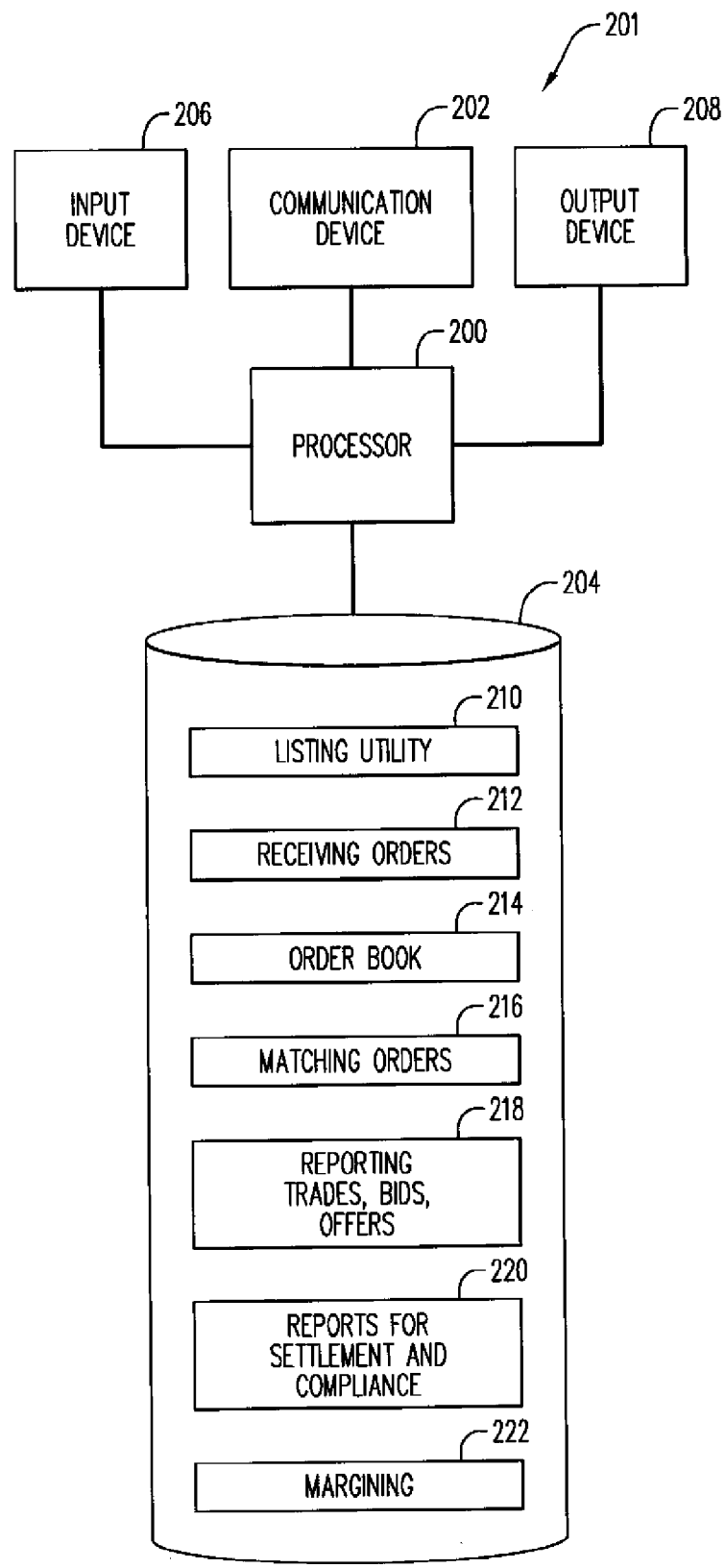
FIG. 2 is a block diagram that illustrates a computer that is operated by a futures trading exchange and that may be included in the system of FIG. 1.

FIG. 2 is a block diagram that illustrates a computer 201 that is operated by the futures trading exchange 102 and that may be included in the trading system 100. The computer 201 may be considered to be represented (possibly with other aspects of the futures trading exchange) by the block 102 in FIG. 1. As depicted, the computer 201 includes a computer processor 200 operatively coupled to a communication device 202, a storage device 204, an input device 206 and an output device 208. Communication device 202 may be used to facilitate communication with, for example, other devices (such as computer systems operated by or on behalf of the brokers/trading firms 108 and/or the reference data source 106). Input device 206 may comprise, for example, a keyboard, a keypad, a mouse or other pointing device, a microphone, knob or a switch, an infra-red (IR) port, a docking station, and/or a touch screen. Input device 206 may be used, for example, to enter information. Output device 208 may comprise, for example, a display (e.g., a display screen), a speaker, and/or a printer.

Storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 201 may be entirely conventional.

Storage device 204 stores one or more programs or portions of programs (at least some of which being indicated by blocks 210-222 in FIG. 2) for controlling processor 200. Processor 200 performs instructions of the programs, and thereby operates in accordance with the present invention. In some embodiments, the programs may include a utility or program or program module 210 by which the futures trading exchange is able to list one or more new futures contracts for trading, where the trading is to be facilitated by operation of the computer 201. Except for the nature of one or more of the futures contracts to be listed, the operation of the listing utility 210 may be in accordance with conventional practices.

Another program stored on the storage device 204 is indicated at block 212 and, when executed by the computer 201, is operative to allow the computer 201 to receive, and at least begin to record and process, orders to buy and orders to sell futures contracts listed on the futures trading exchange 102. Operation of program 212 may be in accordance with conventional practices.

Still another program (or program module) 214 is stored on the storage device 204, and allows the computer 201 to operate to maintain a book of pending but unfilled orders that the futures trading exchange has received. Operation of program 214 may also be in accordance with conventional practices.

Another program (or program module) 216 is stored on the storage device 204 and allows the computer 201 to match buy orders with sell orders, thereby bringing about trading transactions in the listed futures contract. The order matching program 216 may also operate in accordance with conventional practices.

A further program (or program module) stored on the storage device 204 is indicated by block 218. Program 218 handles reporting of trades, as well as outstanding bids and offers. For example, the time, size and price of executed trades in the listed futures contract may be reported by program 218, which may also provide reports on the current state of the order book. Some or all of these reports may, for example, be provided to so-called "ticker" services, for dissemination to the investing public. In general, operation of program 218 may also be in accordance with conventional practices.

Still another program or program module, indicated at 220, may be included among the programs stored by the storage device 204. Program 220 provides reports of activity on the futures trading exchange 102 as needed for compliance with regulatory requirements, and also as required to allow for orderly settlement of trades executed on the futures trading exchange 102. Program 220 may also operate in accordance with conventional practices.

Yet another program or program module 222 is also included in the programs stored by the storage device 204. Program 222 receives data that is indicative of the current value and fluctuations in value of exchange members' positions in the listed futures contract(s) and, based on that data, the program 222 calculates to what extent, if any, each member's account is insufficiently margined, or is margined in excess of requirements. The program 222 also requires that suitable transfers of funds be made by members to their accounts; of course the margining program 222 may also permit withdrawal of funds from the members' accounts to reflect reductions in the amount currently needed to meet margin requirements.

Storage device 204 may also store database management software and one or more databases, none of which is separately indicated from the programs enumerated above. The database(s) may store data required to allow the programs enumerated above to perform their respective functions. There may also be stored in the storage device 204 other software, such as one or more conventional operating systems, device drivers, communications software, etc.

FIG. 3 is a diagram that illustrates terms of an example futures contract that may be listed by the futures trading exchange 102 and traded in the system 100. In the particular example illustrated, the futures contract is denominated in U.S. dollars, as indicated at 252. The underlying or reference swap for the futures contract is indicated at 254 as being a five year floating/floating interest rate swap (IRS), in which on a quarterly basis one counterparty pays the 2-year constant maturity LIBOR swap rate and the other counterparty pays the 10-year constant maturity LIBOR swap rate.

Continuing to refer to FIG. 3, the expiration date of the example futures contract is indicated at 256 and the date on which the example futures contract was listed is indicated at 258. It will be observed that the duration of the futures contract in this example is six months. Other durations are possible.

The notional value of the reference IRS is indicated, at 260, to be $1,000,000. Other notional values, such as $100,000, may be specified in other examples. The quote convention for the example futures contract is indicated at 262 to be in terms of percent of notional value. The tick size, indicated at 264, is 0.01 percent of notional value.

The indication of the settlement terms for the reference swap is shown at 266. The futures contract of this example physically settles into the reference IRS, which is cleared by the clearing house 104. Consequently, a holder of an open position in the example futures contract, upon expiration of the futures contract, will be contractually obligated to take a side of the reference IRS against the clearing house 104. In this example, the holder of a long position in the example futures contract may be obligated to pay on a quarterly basis the 10-year constant maturity LIBOR swap rate side of the reference IRS, and the holder of a short position in the example futures contract may be obligated to pay on a quarterly basis the 2-year constant maturity LIBOR swap rate side of the reference IRS.

In an alternative example, the holder of the long futures position may be obligated to pay the 2-year side of the reference IRS and the holder of the short futures position may be obligated to pay the 10-year side of the reference IRS.

Referring once more to FIG. 3, the trading hours for the example futures contract are indicated at 268 as conforming to the trading hours of the CME (Chicago Mercantile Exchange) Globex exchange. Of course other trading hours may be specified in other examples.

FIG. 3A is a diagram that illustrates terms of another example futures contract that may be listed by the futures trading exchange 102 and traded in the system 100. In the particular example illustrated, the futures contract is denominated in U.S. dollars, as indicated at 302. The underlying or reference swap for the futures contract is indicated at 304 as being a CDX—North America—Investment Grade with a 7 year tenor. That is, the reference swap in this particular example is a credit default index swap defined in terms of the CDX.NA.IG index.

Referring once more to FIG. 3A, the expiration date of the example futures contract is indicated at 306 and the date on which the example futures contract was listed is indicated at 308. It will be observed that the duration of the futures contract in this example is six months. Other durations are possible, including three months, for example.

The notional value of the reference swap is indicated, at 310, to be $1,000,000. Other notional values, such as $100,000, may be specified in other examples. The quote convention for the example futures contract is indicated at 312 to be in terms of percent of notional value. The tick size, indicated at 314, is 0.01 percent of notional value.

The indication of the settlement terms for the reference swap is shown at 316. The futures contract of this example physically settles into the reference swap, which is cleared by the clearing house 104. Consequently, a holder of an open position in the example futures contract, upon expiration of the futures contract, will be contractually obligated to take a side of the reference swap against the clearing house 104. In this example, the holder of a long position in the example futures contract may be obligated to receive the fixed side of the reference swap against the clearing house upon expiration of the futures contract, and the holder of a short position in the example futures contract may be obligated to receive the floating side of the reference swap against the clearing house upon expiration of the futures contract. The party that receives the fixed side of the reference swap may be obligated, upon settlement of the futures contract into the reference swap, to pay to the clearing house any floating payments occasioned by credit events with respect to the reference swap. The party that receives the floating side of the reference swap may be obligated, upon settlement of the futures contract into the reference swap, to pay to the clearing house the fixed "coupon" called for by the reference swap. Either or both of these parties may, of course, free themselves of these obligations by closing out their positions in the reference swap after the physical settlement has occurred. So long as they hold the positions in the reference swap after physical settlement of the futures contract, the parties will be subject to margining requirements from the clearing house 104, just as they were subject to margining requirements by the futures trading exchange 102 with respect to their futures contract positions prior to expiration of the futures contract.

The above account of physical settlement of the futures contract is applicable to ECPs only. In the case of a holder who is not an ECP, the holder's broker will stand in his/her place with respect to the settlement obligations, and most likely will require the holder to close out his/her position in the futures contract prior to expiration of the futures contract.

In an alternative embodiment of the example futures contract, the holder of a short position in the futures contract may be obligated to receive the fixed side of the reference swap against the clearing house upon expiration of the futures contract, and the holder of a long position in the example futures contract may be obligated to receive the floating side of the reference swap against the clearing house upon expiration of the futures contract.

Referring once more to FIG. 3A, the trading hours for the example futures contract are indicated at 318 as conforming to the trading hours of the CME (Chicago Mercantile Exchange) Globex exchange. Of course other trading hours may be specified in other examples.

There are many possible alternatives to the futures contract described in connection with FIG. 3A. For example, the reference swap may be defined in terms of another index, such as another CDX index, or in terms of an iTraxx index. Among the well known CDX indices or subindices, each of which (whether or not listed herein) should be considered a CDX index, are: CDX.NA.IG (Investment Grade), CDX.NA.IG.HVOL (High Volatility), CDX.NA.HY (High Yield), CDX.EM (Emerging Markets). Among the well known iTraxx indices or subindices, each of which (whether or not listed herein) should be considered an iTraxx index, are: iTraxx Europe, iTraxx Europe HiVol, iTraxx Crossover, iTraxx Japan, iTraxx Australia and iTraxx Asia ex-Japan. As other alternatives, the reference swap may be defined in terms of an ABX index provided to define credit default swaps for asset-backed securities, or in terms of a CMBX or ECMBX index provided to define credit default swaps for commercial mortgage backed securities, or in terms of an LCDX index provided to define credit default swaps for loans. The ABX, CMBX, ECMBX and LCDX indices are all owned by CDS IndexCo and managed by Markit Group Limited. In another embodiment, the reference swap may be defined in terms of a "Trac-x" index.

In other embodiments of a futures contract in accordance with this invention, the reference swap may be a single-name credit default swap, which as in the example of FIG. 3A may be cleared via the clearing house 104.

In still other embodiments, the reference swap may be a fixed/floating interest rate swap. In such embodiments, the reference swap may again be cleared via the clearing house 104. As in the previous examples described herein, the futures contract may physically settle, upon expiration, into the reference swap, with the holder of a long position in the futures contract obligated to receive the fixed side of the reference swap and the holder of a short position in the futures contract obligated to receive the floating side of the reference swap, or the holder of the long position obligated to receive the floating side of the reference swap and the holder of the short position obligated to receive the fixed side of the reference swap. As in previous examples, the futures contract holders take their required sides in the swap against the clearing house.

Underlier Swaps in Other Embodiments

In other embodiments, the swap that underlies the futures contract may be a total return swap, an equity swap, a commodity swap, a currency swap, or a yield curve swap. In still other embodiments, the underlying swap may be a so-called "housing swap", i.e., a swap in which one side is obligated to make payments based on an index of housing prices. In further embodiments, the underlying swap may be a so-called "inflation swap", i.e., a swap in which one side is obligated to make payments based on an index of prices for consumer or producer goods and/or services. In still other embodiments, the underlying swap may be a longevity/mortality swap, in which one side is obligated to make payments based on a longevity/mortality index for a particular population.

Other types of swaps that are not explicitly mentioned herein may also underlie a futures contract provided in accordance with the invention.

Figure 4:
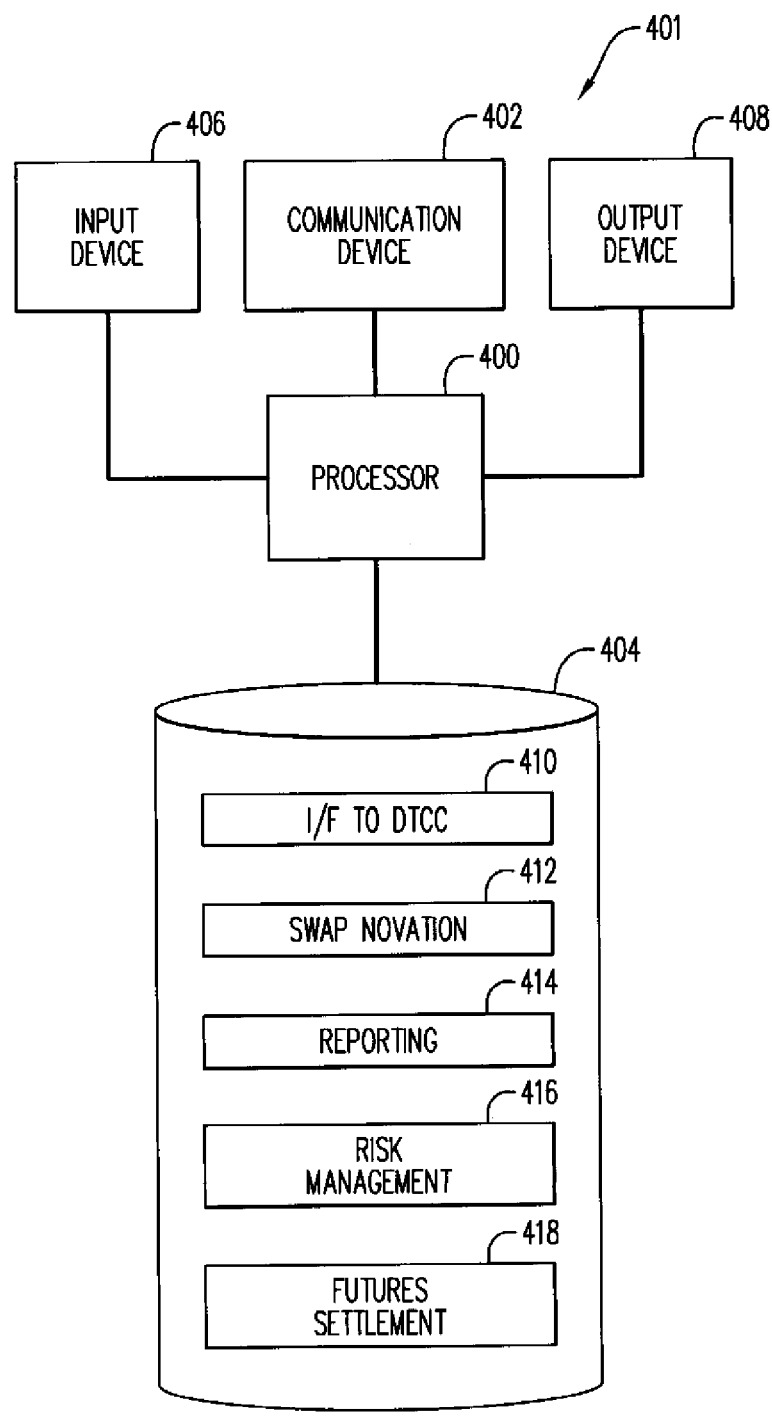
FIG. 4 is a block diagram that illustrates a computer that is operated by a clearing house and that may be included in the system of FIG. 1.

FIG. 4 is a block diagram that illustrates a computer 401 that is operated by the clearing house 102 and that may be included in the trading system 100. The computer 401 may be considered to be represented (possibly with other aspects of the clearing house) by the block 104 in FIG. 1. As depicted, the computer 401 includes a computer processor 400 operatively coupled to a communication device 402, a storage device 404, an input device 406 and an output device 408. Communication device 402 may be used to facilitate communication with, for example, other devices (such as computer systems operated by or on behalf of brokers/trading firms 108 and/or the reference data source 106). Input device 406 may comprise, for example, a keyboard, a keypad, a mouse or other pointing device, a microphone, knob or a switch, an infra-red (IR) port, a docking station, and/or a touch screen. Input device 406 may be used, for example, to enter information. Output device 408 may comprise, for example, a display (e.g., a display screen) a speaker, and/or a printer.

Storage device 404 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 401 may be entirely conventional.

Storage device 404 stores one or more programs or portions of programs (at least some of which being indicated by blocks 410-418) for controlling processor 400. Processor 400 performs instructions of the programs, and thereby operates in accordance with the present invention. In some embodiments, the programs may include a program or program module 410 that provides an interface to a source of swaps transaction information such as the Depository Trust & Clearing Corporation (DTCC).

Another program or program module stored on the storage device 404 is indicated at block 412 and is operative to allow the computer 401 to generate novations of swaps registered with the DTCC and for which the parties to the swaps have requested novation. Novation results in the clearing house 104 taking over, with respect to each party to the swap, the rights and obligations of the counterparty, so that after novation each party's side of the swap is against the clearing house 104. Generally speaking, novation for a given swap will occur only if the clearing house 104 finds that both parties to the swap are qualified to perform their obligations as counterparties relative to the clearing house 104. The swap must also be of a type that the clearing house is engaged in clearing.

Still another program or program module stored on the storage device 404 is indicated at block 414 and handles reporting of transactions involving swaps cleared by the clearing house 104.

Another program or program module stored on the storage device 404 is indicated at 416 and is concerned with automatically generating margining requirements for accounts of holders of swaps cleared by the clearing house 104. In effect, program 404 manages the clearing house's risk relative to its counterparties, who are the holders of the cleared swaps.

Yet another program or program module stored on the storage device 404 is indicated at 418 and generates data to reflect swaps that are needed to come into existence to physically settle, upon expiration, futures contracts listed by the futures trading exchange 102 for which swaps cleared by the clearing house 104 are underliers. As noted above in connection with FIG. 3A, for example, the clearing house 104 stands as the swap counterparty to holders of positions in futures contracts that settle into the cleared swap or swaps.

Storage device 404 may also store database management software and one or more databases, none of which are separately indicated in FIG. 4. The database(s) may store data required to allow the programs enumerated above to perform their respective functions. There may also be stored in the storage device 404 other software, such as one or more conventional operating systems, device drivers, communications software, etc.

Figure 5:
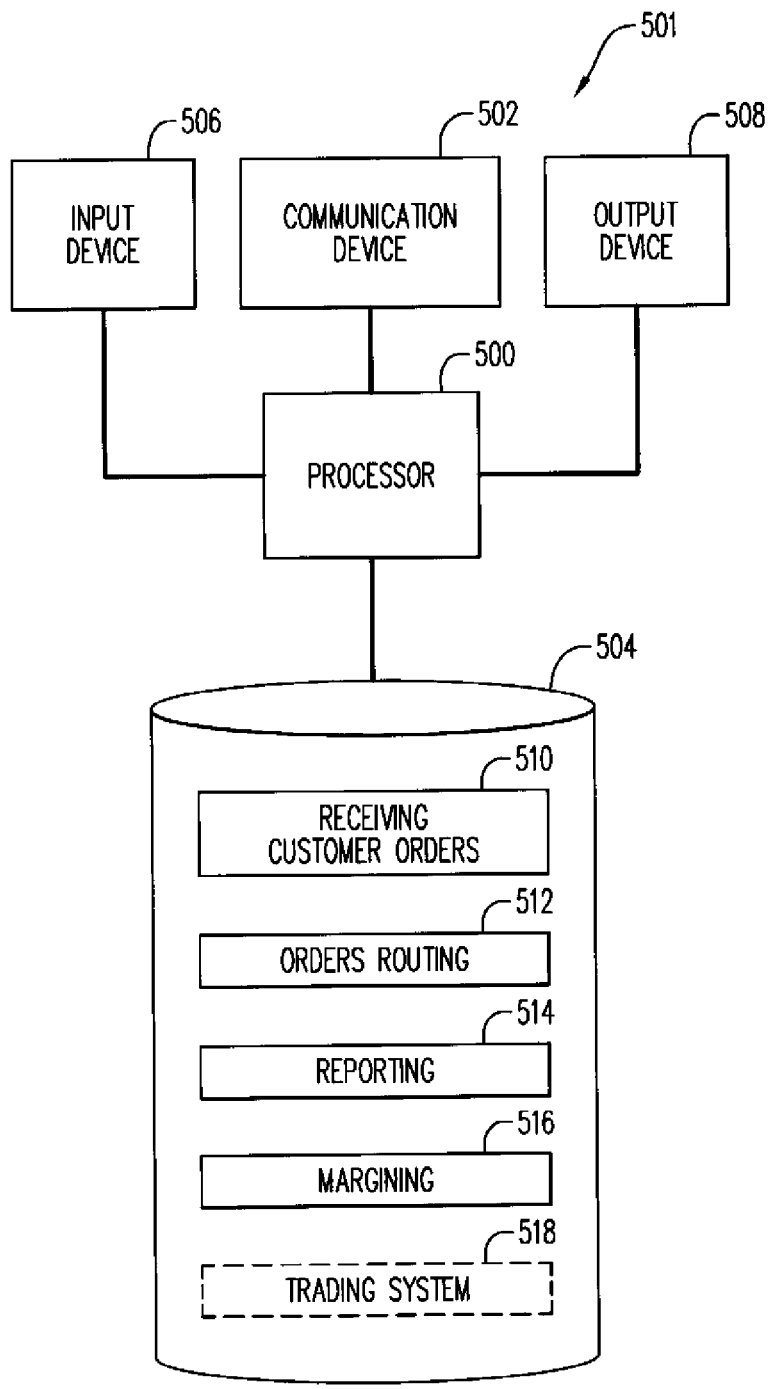
FIG. 5 is a block diagram that illustrates a computer that is operated by a derivatives trading broker and that may be included in the system of FIG. 1.

FIG. 5 is a block diagram that illustrates a typical computer 501 that is operated by a broker 108 and that may be included in the system 100. The computer 501 may be considered to be represented by any one of the blocks 108 in FIG. 1, which may also be considered to represent other aspects of the brokers/trading firms. As depicted, the computer 501 includes a computer processor 500 operatively coupled to a communication device 502, a storage device 504, an input device 506 and an output device 508. Communication device 502 may be used to facilitate communication with, for example, other devices, such as computers 201, 401 mentioned above. Input device 506 may comprise, for example, a keyboard, a keypad, a mouse or other pointing device, a microphone, knob or switch, an infra-red (IR) port, a docking station, and/or a touch screen. Input device 506 may be used, for example, to enter information. Output device 508 may comprise, for example, a display (e.g., a display screen), a speaker, and/or a printer.

Storage device 504 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 501 may be entirely conventional.

Storage device 504 stores one or more programs or portions of programs (at least some of which being indicated by blocks 510-518 in FIG. 5) for controlling processor 500. Processor 500 performs instructions of the programs, and thereby operates in accordance with the present invention. In some embodiments, the programs may include a program 510 for receiving orders to buy or orders to sell a futures contract listed on futures trading exchange 102 or a swap cleared by the clearing house 104. Except for the nature of the futures contract or swap to be traded, the operation of the program 510 may be in accordance with conventional practices. For example, the order receiving program may operate in association with a web hosting/server capabilities of computer 501.

Another program stored on the storage device 504 is indicated at block 512 and is operative, when executed by the computer 501, to allow the computer 501 to select destinations (e.g., an exchange such as futures trading exchange 102) to which a client's order is to be routed, and to transmit the order to the selected destination. In some embodiments, program 512 routes to futures trading exchange 102 client orders for buying or selling futures contracts listed by the futures trading exchange 102.

The programs shown as stored in storage device 504 also include a program 514 that allows the computer 501 to compile reports of orders received and executed, as required for internal and external compliance obligations and as needed to confirm to clients trading activities performed by the broker on the clients' behalf.

Another program or program module 516 is included in the programs stored by the storage device 504. Program 516 receives data that is indicative of the current value and fluctuations in value of holdings in the accounts of the broker's clients. Based on that information, the program 516 calculates to what extent, if any, each client's account is insufficiently margined, or is margined in excess of requirements. The program 516 also requires that suitable transfers of funds be made by clients to their accounts to satisfy margin requirements, and automatically sends to clients messages to indicate that the clients are required to make the transfers. The margining program 516 may also permit clients to withdraw funds from their accounts to reflect reductions in the amount currently needed to meet margin requirements. The margining program 516 may automatically send to clients notices of occasions when such withdrawals are permitted.

Indicated in phantom at 518 is another program that may be included in the programs stored by storage device 504. Program 518, if present, provides functionality to allow trading, by employees of the broker/trading company that operates computer 501, for the account of the broker/trading company. Numerous varieties of trading systems are known, and this trading program 518 may operate in accordance with conventional principles, except to the extent that at least some of the financial products traded by use of the trading system program 518 may be novel futures contracts and/or cleared swaps of the kinds described herein.

Storage device 504 may also store database management software and one or more databases, none of which are separately indicated in FIG. 5. The database(s) may store data required to allow the programs discussed in connection with FIG. 5 to perform their respective functions. There may also be stored in the storage device 504 other software, such as one or more conventional operating systems, device drivers, communication software, etc.

Figure 6:
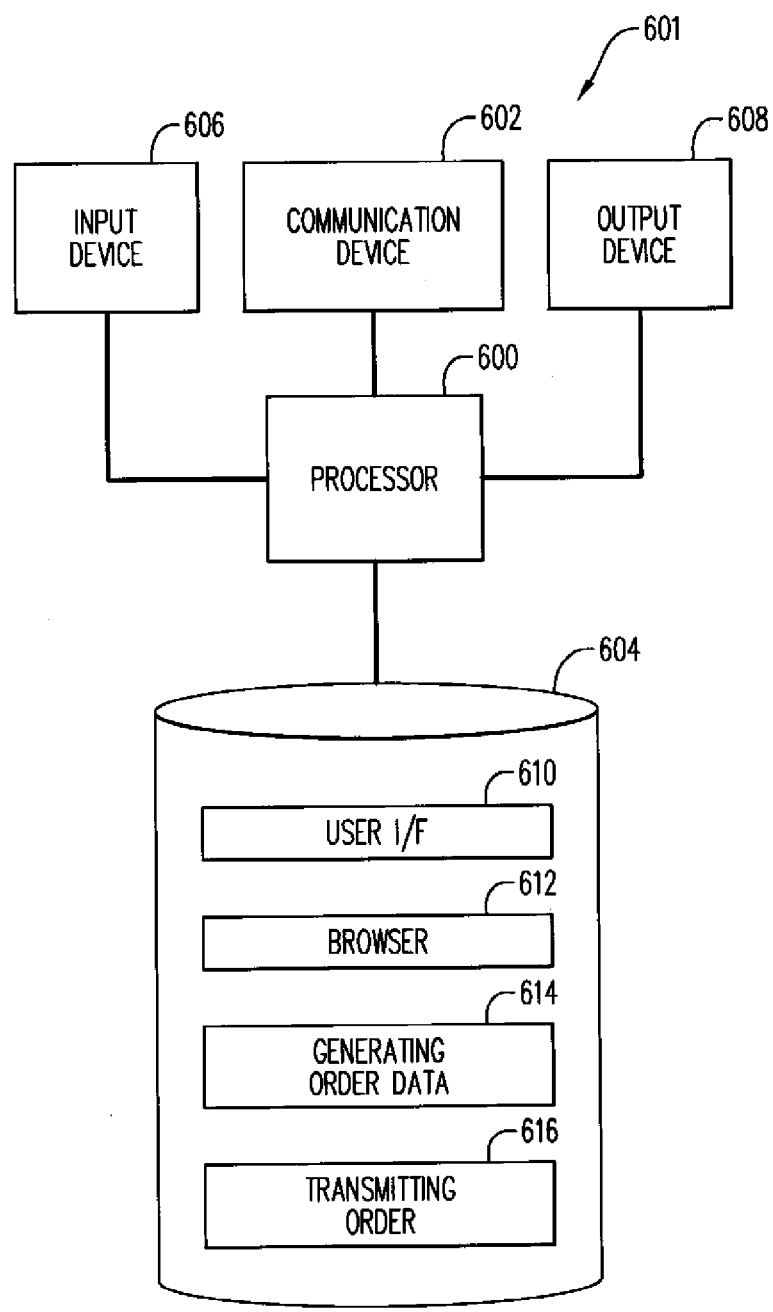
FIG. 6 is a block diagram that illustrates a computer that is operated by a client of a broker and that may be included in the system of FIG. 1.

FIG. 6 is a block diagram that illustrates a typical computer 601 that is operated by a client 110 of a broker 108 and that may be included in the system 100. The computer 601 may be considered to be represented (possibly with other aspects of a client) by any one of the blocks 110 in FIG. 1. As depicted, the computer 601 includes a computer processor 600 operatively coupled to a communication device 602, a storage device 604, an input device 606 and an output device 608. Communication device 602 may be used to facilitate communication with, for example, other devices such as computer 501 discussed above. Input device 606 may comprise, for example, a keyboard, a keypad, a mouse or other pointing device, a microphone, knob or switch, an infra-red (IR) port, a docking station, and/or a touch screen. Input device 606 may be used, for example, to enter information. Output device 608 may comprise, for example, a display (e.g., a display screen), a speaker, and/or a printer.

Storage device 604 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

In some embodiments, the hardware aspects of the computer 601 may be entirely conventional.

Storage device 604 stores one or more programs or portions of programs (at least some of which being indicated by blocks 610-616 in FIG. 6) for controlling processor 600. Processor 600 performs instructions of the programs, and thereby operates in accordance with the present invention. In some embodiments, the programs may include a program or program module 610 to provide a user interface. At least some part of the user interface may be produced by or utilize functionality of a standard operating system, which is not separately indicated.

Another program 612 included in the programs stored in the storage device 604 may be a conventional browser. The browser 612 may be employed, for example, to gather and/or receive current quotations with respect to various financial products, such as the futures contracts and cleared swaps described herein. The browser 612 may allow the computer 601 to interact with server capabilities of a computer 501 operated by the broker 108 that serves the client who operates computer 601.

The programs stored in the storage device 604 may also include a program or program module 614. The program/module 614 may operate in conjunction with the user interface 610 to allow the client to specify parameter data for an order that the client wishes to place to buy or sell a futures contract of the type described herein. The client may enter the parameter data for the order by using the input device 606, for example. The parameter data for the order may include a designation of the particular futures contract to be bought or sold, the "size" of the order (i.e., the number of contracts to be bought or sold in the order), the "side" of the order (i.e., whether the order is a sell order or a buy order), the "type" of the order (i.e., whether the order is a limit order or whether the order is to be executed at the market). If the order is a limit order, the parameter data for the order also includes the limit price for the order. The parameter data for the order is generated in the computer 601 by the client's operation of the input device 606 to enter the parameter data. At the time it is generated, the parameter data for the order is stored at least temporarily in the storage device 604, pending operation of program module 616 to transmit the order, including the parameter data therefor, to a computer 501 operated by the broker 108 that serves the client in question.

Storage device 604 may also store database management software and one or more databases, none of which are separately indicated from the programs indicated in FIG. 6. The database(s) may store data required to allow the programs stored in the storage device 604 to perform their respective functions. There may also be stored in the storage device 604 other software, such as the above-mentioned operating system, device drivers, communications software, etc.

Figure 7:
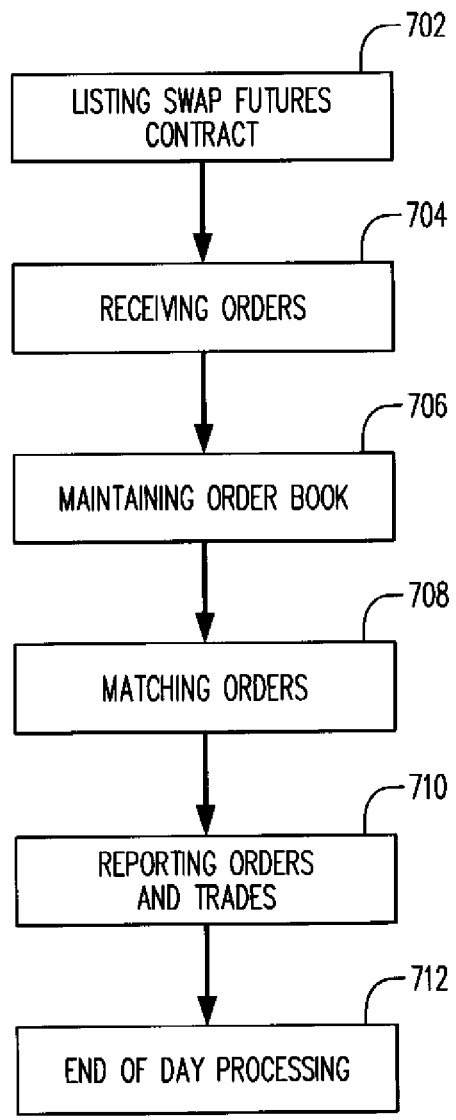
FIG. 7 is a flow chart that illustrates a process that may be performed by the futures trading exchange using the computer of FIG. 2.

FIG. 7 is a flow chart that illustrates a process that may be performed by the futures trading exchange 102 using the computer 201. At 702 in FIG. 7, the futures trading exchange 102 lists one or more futures contracts that physically settle upon expiration into swaps cleared by the clearing house 104 (there may be more than one clearing house to clear selected ones of the swaps into which the futures contracts physically settle). For example, in the case of futures contracts that settle into credit default index swaps, when a "roll" of credit default swap indices occurs, with the index company (e.g., IIC or Markit Group Limited) announcing the baskets for a number of such indices, the futures trading exchange 102 may shortly afterward list one or more futures contracts corresponding to at least some of the indices. Listing of one or more new futures contracts may occur quarterly, for example, soon after each "roll" of the reference credit default index swaps. For example, the futures trading exchange 102 may select one or two of the most widely traded credit default swap indices and may list one or two futures contract, each of which settles physically into a cleared credit default index swap defined by the corresponding index. In a presently preferred embodiment, for each credit default swap index selected by the futures trading exchange 102, the futures trading exchange 102 may list one futures contract, with an expiration date six months after listing, and calling for physical settlement upon expiration into a credit default swap defined in terms of the selected index and cleared by the clearing house 104. It is considered likely that the futures contract would open for trading about at par.

In an alternative embodiment, for at least some of the selected indices, two or more futures contracts, of different durations, may be listed shortly after the indices "roll". For example, for a selected index, two futures contracts may be listed, one to expire six months after listing, and the other to expire three months after listing.

In some embodiments, the listing of futures contracts may (in addition or alternatively) include those that physically settle into swaps (other than those referred to in the last few paragraphs), such as, for example, swaps that are defined in terms of tranches of credit default index swaps, single-name credit default swaps, fixed/floating interest rate swaps, or any of the other types of swaps referred to above in the section headed "Underlier Swaps in Other Embodiments".

At 704 in FIG. 7, the computer 201 receives an order to buy one of the futures contracts listed at 702 or an order to sell one of the futures contracts listed at 702. The order may have originated with a client 110 and been routed to the futures trading exchange 102 via the broker 108 that serves the client in question. Alternatively, the order may have been originated by a broker/trading firm 108 trading for its own account. In either case, the order may include some or all of the order parameter data described above with reference to block 614 of FIG. 6. In conjunction with receiving the order, the computer may time-stamp the order and store it, including the order parameter data, in storage device 204. It will be appreciated that this step of receiving an order includes receiving electronic signals that represent an order to buy the futures contract in question or an order to sell the futures contract in question and that include the order parameter data for the order.

At 706 in FIG. 7, the computer 201 maintains, for each listed futures contract, a book of limit orders received in step 704 to buy or sell the futures contract in question. The construction and maintenance of the order book may be in accordance with conventional practices. It will be appreciated that the activities described at 704 and 706 may be ongoing (at least during the trading day, with respect to 704, and overnight as well with respect to 706).

At 708 in FIG. 7, the computer 201 matches buy orders with sell orders with respect to each listed futures contract. This, too, may be done in accordance with conventional practices, and may be ongoing during the trading day as orders are received.

At 710 in FIG. 7, the computer 201 provides reports of trades executed and orders placed in the order book(s) for the listed futures contract(s). This reporting may, among other functions, be a source of market quotations for potential traders. Moreover, the reporting may be such as required to comply with regulatory policies and the internal requirements of the futures trading exchange 102.

At 712 in FIG. 7, the computer 201 performs conventional functions required for overnight processing and to facilitate settlement of trades executed during the trading day.

Figure 8:
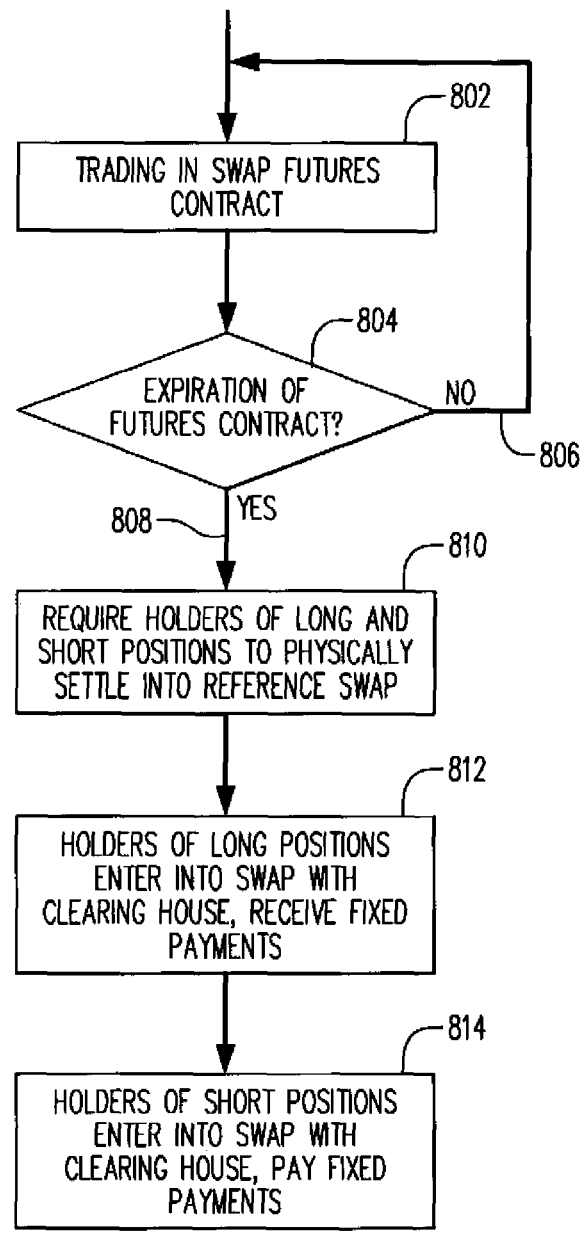
FIG. 8 is a flow chart that illustrates a process that may be performed in the system of FIG. 1.

FIG. 8 is a flow chart that illustrates a process that may be performed in the system 100. As indicated at 802, trading takes place on the futures trading exchange 102 in a futures contract listed on the futures trading exchange 102. It is assumed that the futures contract is like those described hereinabove, i.e., that the futures contract physically settles into a cleared swap.

As indicated at decision block 804, a determination is made as to whether the expiration date has arrived for the futures contract. If not, as indicated by branch 806 from decision block 804, the trading in the futures contract continues. Branch 808 from decision block 804 is triggered upon expiration of the futures contract, and leads to block 810. At block 810 (i.e., upon expiration of the futures contract), holders of open positions in the futures contract are required to physically settle their positions into the cleared swap that is the reference swap for the futures contract. (As noted above, when the holder of a position in the futures contract is not an ECP, the holder's broker stands in the holder's place vis a vis the obligation to physically settle. Accordingly, it can be expected that the brokers will require non-ECP clients to close out their positions in the futures contract prior to expiration.)

Blocks 812 and 814 elaborate on block 810 and respectively indicate that (in this example) physical settlement of a long position in the futures contract entails entering into the reference swap with the clearing house to receive the fixed side of the reference swap, and physical settlement of a short position in the futures contract entails entering into the reference swap with the clearing house to receive the floating side of the reference swap. In this example, and assuming further that the reference swap is a credit default swap (single-name or a credit default index swap), the receiver of the fixed side of the reference swap is obligated to the clearing house to make the "floating" payment(s), which are contingent on occurrence of a credit event or event(s). Similarly, with the same assumption as in the previous sentence, the receiver of the floating side of the reference swap is obligated to the clearing house to make the fixed payments (i.e., the "coupon") called for by the reference swap. Analogous obligations to the clearing house may apply to the parties entering into the swaps with the clearing house in the case of other types of reference swaps.

In some embodiments, where the reference swap is a credit default index swap, the particular version of the reference swap into which the futures contract is to settle may be selected at the beginning of the last "quarter" before expiration of the futures contract. As used herein "quarter" should be understood to mean the period between and including the $20^{th}$ (or next business day) of any cardinal month, to but excluding the $20^{th}$ or next business day of the next cardinal month. The version of the reference swap selected for settlement may be one that excludes any entity for which a credit event has been determined on the reference credit basket prior to the date of selection. At expiration, the reference credit swap may be defined to include as payments: (a) the fixed payment for the last quarter of the life of the futures contract—i.e., the reference credit coupon multiplied by: (days in prior quarter/360), (b) any floating payment that has been determined to settle any credit event on any reference entity during the last quarter of the life of the futures contract, (c) all future fixed and floating payments on the reference credit swap.

It will be appreciated that holders of open positions in futures contracts described herein may liquidate their positions prior to expiration of the futures contract to avoid being obligated to enter into the underlying swap upon expiration of the futures contract. As an alternative to liquidating their futures contracts positions, holders may, in some embodiments, enter into an off-exchange transaction, prior to futures contract expiration and settlement. In the off-exchange transaction (analogous to known transactions for conventional futures contracts), the holder may take the corresponding side of the underlying swap, or of a similar swap, as a substitute for the open futures contract position. Such an off-exchange transaction may prevent a taxable event from occurring with respect to liquidation or settlement of the futures contract.

Figure 9:
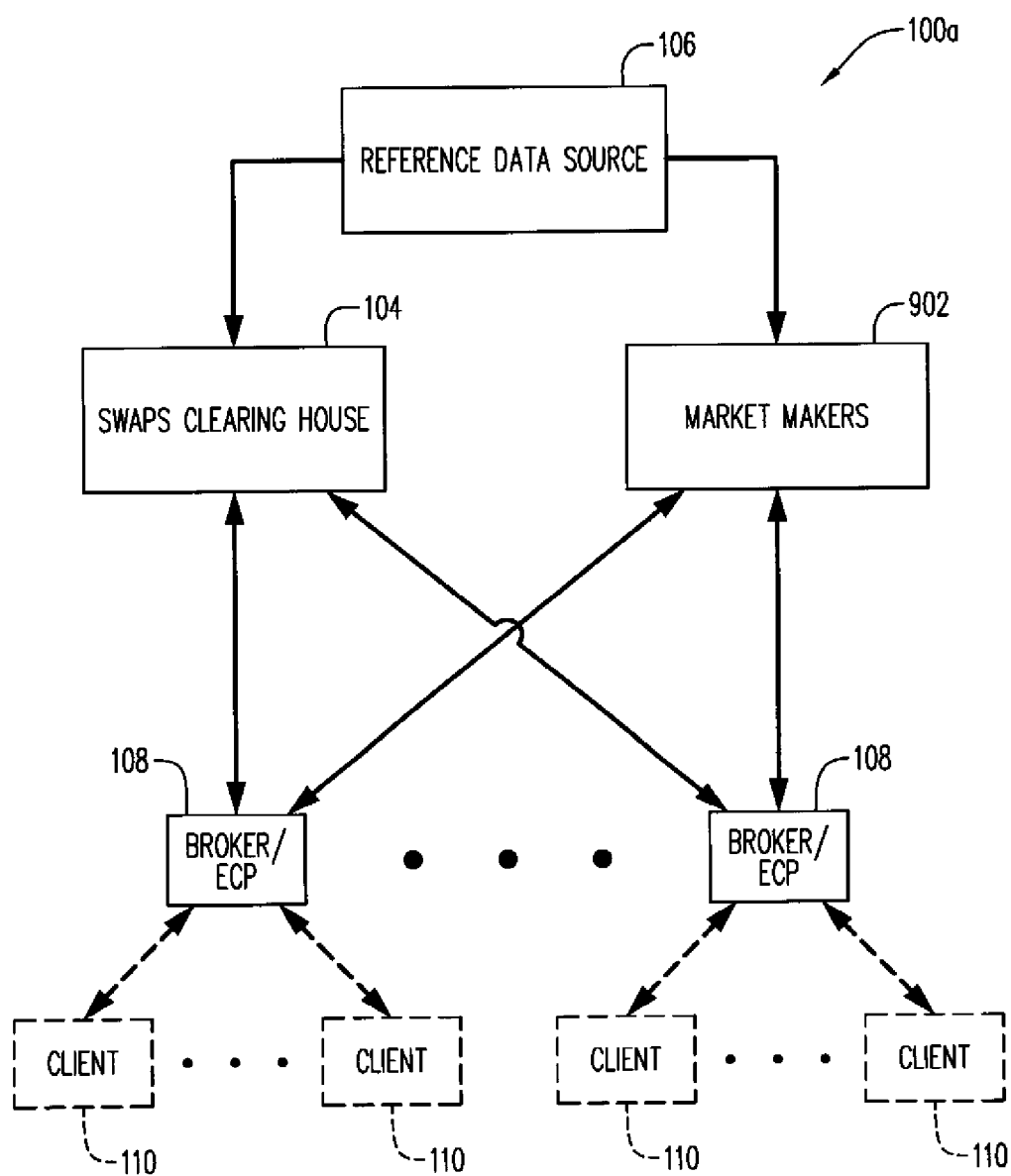
FIG. 9 is a block diagram that illustrates an alternative embodiment of a system provided to facilitate trading in futures contracts.

FIG. 9 is a block diagram that illustrates an alternative embodiment of a system (generally indicated by reference numeral 102a) provided to facilitate trading in futures contracts.

The trading system 102a shown in FIG. 9 is generally similar in structure and functioning to the system 100 described above with reference to FIGS. 1-8, except that trading system 102a lacks a futures trading exchange that lists the physically-settled swap futures described above. Instead, the trading system 102a has one or more market makers 902 that perform the function of bringing together orders to buy and sell the futures contracts in question. The market makers each make a market in one or more of the futures contracts, which may be of one or more of the type or types described above in connection with the trading system 100.

Figure 10:
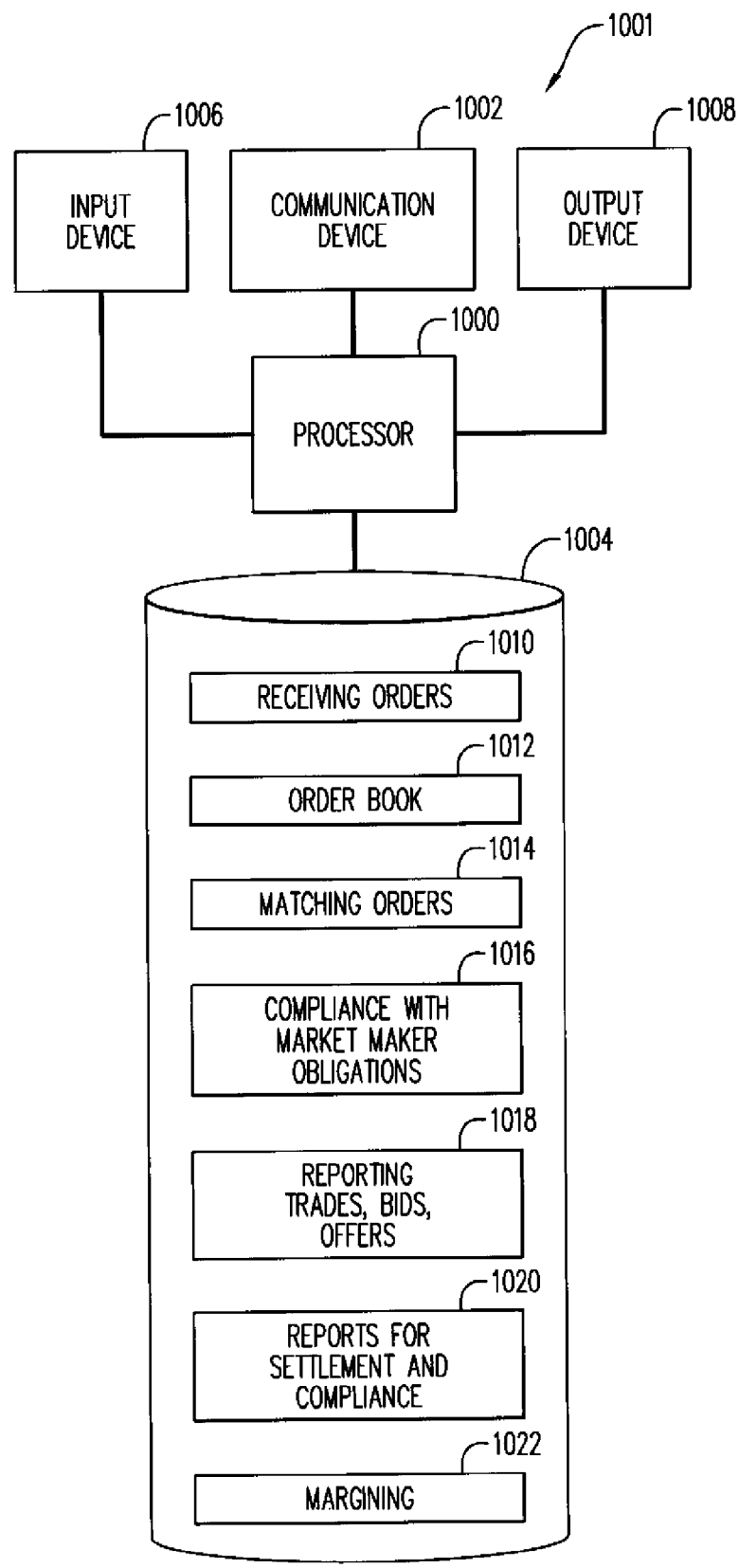
FIG. 10 is a block diagram that illustrates a computer that is operated by a futures trading market maker and that may be included in the system of FIG. 9.

FIG. 10 is a block diagram that illustrates a computer 1001 that is operated by a futures trading market maker 902 and that may be included in the system 100a. In its hardware aspects, the computer 1001 may be substantially the same as, or at least closely analogous to the hardware that makes up the computer 201 described above. Hence, it is not necessary to describe in detail the hardware aspects of computer 1001. Moreover, the storage device 1004 of the computer 1001 may store programs or portions of programs 1010-1022. Programs 1010, 1012 and 1014 may respectively be substantially the same as or closely analogous to the programs 212, 214 and 216 described above in connection with FIG. 2. Also programs 1018, 1020 and 1022 may respectively be substantially the same as or closely analogous to the programs 218, 220 and 222 described above in connection with FIG. 2. Program 1016 may allow the computer 1001 to operate so that it at least partially performs the obligations to make a market that are the duty of the market maker 902 that operates the computer 1001. For example, as part of those obligations, the market maker 902, through its computer 1001, submits or accepts limit orders to buy or sell futures contracts in which the market maker is undertaking to make a market, as necessary to maintain orderly trading in the futures contracts.

FIGS. 7 and 8 and the above description thereof are not meant to imply a fixed order of steps. Rather, the method steps may be performed in any order that is practicable. At least some of the steps may be performed simultaneously with one or more of the other steps illustrated in FIGS. 7 and 8.

At least some of the steps illustrated in FIGS. 7 and 8 may be performed by the computers referred to herein either by itself or themselves and/or in concert with other computers that may or may not be shown herein.

In some embodiments, one or more of the brokers 108 may act as a market maker with respect to one or more of the cleared swaps that underlie the physically-settled swap futures contracts.

Considering FIG. 1 again, given that each of the blocks may, at least in part, represent a computer, the arrow marks that interconnect the blocks may each represent dedicated or virtual data communication paths among such computers. For example, the data communication paths may be realized by using one or more public or private data communication networks, which may for example be secured by suitable encryption algorithms.

Although no data communication path is explicitly shown in FIG. 1 between the futures trading exchange 102 and the swaps clearing house 104, such a data communication path may in fact be provided, at least from time to time, and may be used as necessary or convenient to facilitate operation of either or both of the futures trading exchange 102 and the swaps clearing house 104.

In the above description of the client computer 601, there was discussion of how such a computer may generate, store and transmit parameter data for an order to buy or sell a novel futures contract of the type disclosed herein. It should be understood that a broker/trading firm computer 501 may also generate, store and/or transmit parameter data for an order to buy or sell a novel futures contract as disclosed herein either for its own account or on behalf of a client.

In some embodiments, some or all of the swaps that underlie the physically-settled swap futures need not be cleared by a clearing house, and the clearing house may accordingly be omitted from the trading system 100 or from the trading system 100a.

In at least some cases, the swaps that underlie the physically-settled swap futures may be defined in accordance with a "Master Agreement" maintained by the International Swaps and Derivatives Association (ISDA).

In some embodiments, in the cases where the underlying swap is a credit default swap or credit default index swap, the underlying swap itself may be either physically or cash settled. As will be understood by those who are skilled in the art, if the underlying swap calls for physical settlement, the receiver of floating is required to tender an underlying obligation of the defaulting name as a condition of receiving the floating payment; if the underlying swap is cash settled, then delivery of the obligation of the defaulting name is not required.

In the cases where the underlying swap is a credit default index swap, the tenor of the underlying swap may be 1 year, 2 years, 3 years, 5 years, 7 years, 10 years or any other useful tenor.

In some embodiments, options on the novel futures contracts may also be listed.

As used herein and in the appended claims, "listing" refers to placing a futures contract on an official list of financial products available for trading on a trading exchange.

As used herein and in the appended claims, "swap" refers to a contract under which counterparties exchange conditional or unconditional obligations to make a payment or payments, and includes, but is not limited to, any transaction defined as a swap in a Master Agreement or Definition published by the ISDA.

As used herein and in the appended claims, "trading exchange" refers to a marketplace to which orders to buy futures contracts and orders to sell futures contracts may be submitted for execution.

As used herein and in the appended claims, "trading" includes one or more of placing an order to buy a futures contract, placing an order to sell a futures contract, and matching an order to buy a futures contract with an order to sell the futures contract.

As used herein and in the appended claims, "futures contract" refers to a standardized contract, traded on an established marketplace, to acquire or dispose of a certain underlying instrument at a certain date.

It need not necessarily be the case, for a swap that underlies a futures contract as described herein, that the two sides of the swap be commonly thought of as comprising a "fixed" side and a "floating" side. For swaps that are not so thought of (e.g., swaps for which both sides are commonly regarded as "floating" or both "fixed"), and without loss of generality in view of the manner in which the appended claims are drawn, one side of the swap may be arbitrarily designated "fixed" and the other side, "floating", for purposes of the appended claims. For example, in a floating/floating interest rate swap, the side which receives the longer-term rate may be designated as "fixed", and the other side, "floating".

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method for facilitating futures contract trading, comprising:
   listing via a processor a futures contract available for trading, the futures contract including terms that require settlement into a specified swap on a specified date;
   receiving via the processor orders to buy or orders to sell the futures contract;
   maintaining via the processor a book of limit orders for the received orders to buy or orders to sell the futures contract;
   determining via the processor an expiration date for the listed futures contract:
   matching via the processor the orders to buy with orders to sell for each listed futures contract based on the determined expiration date;
   generating via the processor reports including a current state of the book of limit orders and trading activity for compliance with regulatory requirements; and
   settling via the processor the futures contract on the specified date by entering into the specified swap.

2. The method of claim 1, wherein
   (a) said futures contract provides that (i) a long position in said futures contract entitles a holder of the long position to receive a fixed side of the specified swap on the specified date, and (ii) a short position in said futures contract entitles a holder of the short position to receive a floating side of the specified swap on the specified date, or
   (b) said futures contract provides that (i) a short position in said futures contract entitles the holder of the short position to receive a fixed side of the specified swap on the specified date, and (ii) a long position in said futures contract entitles the holder of the long position to receive a floating side of the specified swap on the specified date.

3. The method of claim 1, wherein the specified swap is a credit default index swap.

4. The method of claim 3, wherein the credit default index swap is defined according to one of (a) a Dow Jones CDX index, (b) a CDX index, (c) an iTraxx index, (d) an ABX index, (e) a CMBX index, (f) an ECMBX index, and (g) an LCDX index.

5. The method of claim 3, wherein the specified swap is defined in terms of a tranche of a credit default index swap.

6. The method of claim 3, wherein the specified swap is a single-name credit default swap.

7. The method of claim 3, wherein the specified swap is an interest rate swap or a yield curve swap.

8. The method of claim 3, wherein the specified swap is against a specified counterparty.

9. The method of claim 8, wherein the specified counterparty is a clearing house.

10. An apparatus for facilitating futures contract trading, comprising:
    a memory;
    a processor disposed in communication with said memory, and configured to issue a plurality of processing instructions stored in the memory, wherein the processor issues instructions to:
    list a futures contract available for trading, the futures contract including terms that require settlement into a specified swap on a specified date;
    receive orders to buy or orders to sell the futures contract;
    maintain via the processor a book of limit orders for the received orders to buy or orders to sell the futures contract;
    determine an expiration date for the listed futures contract;
    match the orders to buy with orders to sell for each listed futures contract based on the determined expiration date;
    generate reports including a current state of the book of limit orders and trading activity for compliance with regulatory requirements; and
    settle the futures contract on the specified date by entering into the specified swap.

11. An apparatus of claim 10, wherein
    (a) said futures contract provides that (i) a long position in said futures contract entitles a holder of the long position to receive a fixed side of the specified swap on the specified date, and (ii) a short position in said futures contract entitles a holder of the short position to receive a floating side of the specified swap on the specified date, or
    (b) said futures contract provides that (i) a short position in said futures contract entitles the holder of the short position to receive a fixed side of the specified swap on the specified date, and (ii) a long position in said futures contract entitles the holder of the long position to receive a floating side of the specified swap on the specified date.

12. A non-transitory processor-readable medium storing a plurality of processing instructions, comprising issuable instructions by a processor to:
    list via a processor a futures contract available for trading, the futures contract including terms that require settlement into a specified swap on a specified date;
    receive via the processor orders to buy or orders to sell the futures contract;
    maintain via the processor a book of limit orders for the received orders to buy or orders to sell the futures contract;
    determine via the processor an expiration date for the listed futures contract;
    match via the processor the orders to buy with orders to sell for each listed futures contract based on the determined expiration date;
    generate via the processor reports including a current state of the book of limit orders and trading activity for compliance with regulatory requirements; and
    settle via the processor the futures contract on the specified date by entering into the specified swap.

13. The non-transitory processor-readable medium of claim 12, wherein
    (a) said futures contract provides that (i) a long position in said futures contract entitles a holder of the long position to receive a fixed side of the specified swap on the specified date, and (ii) a short position in said futures contract entitles a holder of the short position to receive a floating side of the specified swap on the specified date, or
    (b) said futures contract provides that (i) a short position in said futures contract entitles the holder of the short position to receive a fixed side of the specified swap on the specified date, and (ii) a long position in said futures contract entitles the holder of the long position to receive a floating side of the specified swap on the specified date.

14. The non-transitory processor-readable medium of claim 12, wherein the specified swap is a credit default index swap.

15. The non-transitory processor-readable medium of claim 12, wherein the specified swap is defined in terms of a tranche of a credit default index swap.

16. The non-transitory processor-readable medium of claim 12, wherein the specified swap is a single-name credit default swap.

17. The non-transitory processor-readable medium of claim 12, wherein the specified swap is an interest rate swap or a yield curve swap.

18. The non-transitory processor-readable medium of claim 12, wherein the specified swap is against a specified counterparty.

19. The non-transitory processor-readable medium of claim 18, wherein the specified counterparty is a clearing house.

* * * * *